The United States of America.

*To all to whom these Letters Patent shall come:*

WHEREAS Samuel Morey, a citizen of the State of [illegible] in the United States, hath alledged that he has invented a new and useful improvement in obtaining [illegible] from water with the [illegible] of steam, which improvement has not been known or used before his application; has made oath that he does verily believe that he is the true inventor or discoverer of the said improvement; has paid into the Treasury of the United States, the sum of thirty dollars, delivered a receipt for the same, and presented a petition to the Secretary of State, signifying a desire of obtaining an exclusive property in the said improvement, and praying that a patent may be granted for that purpose: THESE ARE THEREFORE to grant, according to law, to the said Samuel Morey, his heirs, administrators, or assigns, for the term of fourteen years, from the [illegible] day of [illegible] the full and exclusive right and liberty of making, constructing, using and vending to others to be used, the said improvement, a description whereof is given in the words of the said Samuel Morey himself, in the schedule hereto annexed, and is made a part of these presents.

IN TESTIMONY WHEREOF, *I have caused these Letters to be made Patent, and the Seal of the United States to be hereunto affixed.*

*GIVEN under my hand, at the City of* [illegible] *this* [illegible] *day of* [illegible] *in the Year of our Lord, one thousand eight hundred* [illegible] *and of the Independence of the United States of America, the* [illegible]

[illegible] Adams

By the PRESIDENT,

[illegible] *Secretary of State.*

*City of* [illegible] —To wit:

I DO HEREBY CERTIFY, That the foregoing Letters Patent, were delivered to me on the [illegible] day of [illegible] in the year of our Lord one thousand eight hundred [illegible] to be examined; that I have examined the same, and find them conformable to law. And I do hereby return the same to the Secretary of State, within fifteen days from the date aforesaid, to wit: On this [illegible] day of [illegible] in the year aforesaid.

[illegible]

[illegible] The schedule referred to in these Letters Patent and making part of the same containing a description in the words of the said Samuel Morey himself of his improvement in obtaining a force or power from water, with the assistance of Steam.

Description & specification of Samuel Morey's improvement in the mode of obtaining a force from water with the assistance of Steam, that is to say, it consists of a boiler for forming the steam and a box divided into two or more parts, and containing an over shot or other water wheel. A pipe to lead the steam from the boiler into the lower part of the box, with a valve in the lower end of the same opening into the pipe, also an other valve in the said lower box to open inward & connected with the one in the pipe from the boiler, so when one is opened it will shut the other, for letting out the steam at certain times, and another for letting the water down into the lower box and a pipe or tube communicating between the lower and upper boxes, for the water to rush up through, with a valve in the upper end of the same, to prevent its returning, with an aperture over the wheel in the bottom of the upper box to let the water fall through on to the wheel. [illegible] the lower box [illegible] two parts with a valve to open out of that which the water comes up in and forming a vacuum in that part which the water rises in it will be forced up with much greater velocity, or when the water strikes or impinges directly against the wheel, by forming a vacuum in that part which turns it (wheel) it will strike with much greater force or power on the wheel. The quantity of water raised will depend on the quantity of Steam formed each gallon of which will force nearly one gallon of Water from the lower box into the upper one.

Witnesses
Daniel [illegible]
Ephraim Kingsbury Jr.

Sam'l Morey